United States Patent
Chang et al.

(10) Patent No.: US 12,418,958 B2
(45) Date of Patent: Sep. 16, 2025

(54) PC5 RADIO RESOURCE CONTROL (RRC) SIDELINK (SL) CONNECTION MANAGEMENT WITH BASE STATION NOTIFICATION

(71) Applicant: Kyocera Corporation, Kyoto (JP)

(72) Inventors: Henry Chang, San Diego, CA (US); Masato Fujishiro, Yokohama (JP)

(73) Assignee: Kyocera Corporation, Kyoto (JP)

( * ) Notice: Subject to any disclaimer, the term of this patent is extended or adjusted under 35 U.S.C. 154(b) by 588 days.

(21) Appl. No.: 17/913,300

(22) PCT Filed: Apr. 1, 2021

(86) PCT No.: PCT/US2021/025324
§ 371 (c)(1),
(2) Date: Sep. 21, 2022

(87) PCT Pub. No.: WO2021/206989
PCT Pub. Date: Oct. 14, 2021

(65) Prior Publication Data
US 2023/0144504 A1    May 11, 2023

Related U.S. Application Data

(60) Provisional application No. 63/007,799, filed on Apr. 9, 2020.

(51) Int. Cl.
*H04W 76/30*    (2018.01)
*H04W 36/00*    (2009.01)
(Continued)

(52) U.S. Cl.
CPC ......... *H04W 76/30* (2018.02); *H04W 36/037* (2023.05); *H04W 76/25* (2018.02); *H04W 92/18* (2013.01)

(58) Field of Classification Search
CPC ... H04W 76/30; H04W 76/25; H04W 36/037; H04W 92/18
See application file for complete search history.

(56) References Cited

U.S. PATENT DOCUMENTS

2020/0396701 A1* 12/2020 Yi ..................... H04W 72/569
2021/0105788 A1*  4/2021 Kim .................. H04L 41/0869
2021/0336688 A1  10/2021 Lee et al.

FOREIGN PATENT DOCUMENTS

WO       2020/032653 A1     2/2020

OTHER PUBLICATIONS

LG Electronics; "Remaining issue on SL RLF reporting," R2-1915514; 3GPP TSG-RAN WG2 Meeting #108; Nov. 17, 2019; Reno, US.
(Continued)

*Primary Examiner* — Samina F Choudhry

(57) ABSTRACT

After receiving a PC5 RRC connection released notification from a source user equipment (UE) device, a base station notifies a peer UE device. Where the base station is the serving base station of the peer UE device, the base station sends a PC5 RRC connection released notification peer message to the peer UE device. Where the base station is not the serving base station of the peer UE device, the base station sends a PC5 RRC connection released notification base station message to the other base station that is serving the peer UE device and the other base station sends a notification peer message to the peer UE device. In some situations, the base station evaluates data to determine whether notification should be sent to the peer UE device. At least some of the data may be included in the notification received from the source UE device.

25 Claims, 7 Drawing Sheets

(51) Int. Cl.
*H04W 76/25* (2018.01)
*H04W 92/18* (2009.01)

(56) References Cited

OTHER PUBLICATIONS

Intel Corporation; "Considerations on SL RLM/RLF procedure," R2-1914849; 3GPP TSG-RAN WG2 Meeting #108; Nov. 8, 2019; Reno, US.
Mediatek Inc.; "Capturing RLM for NR sidelink in stage 2," R2-1915792; 3GPP TSG-RAN WG2 Meeting #108; Nov. 8, 2019; Reno, US.
Mediatek Inc.; "Link management for unicast," R2-1901063; 3GPP TSG-RAN WG2 Meeting #105; Feb. 15, 2019; Athens, GR.

\* cited by examiner

PC5 RADIO RESOURCE CONTROL (RRC) SIDELINK (SL) CONNECTION MANAGEMENT WITH BASE STATION NOTIFICATION

CLAIM OF PRIORITY

The present application claims the benefit of priority to Provisional Application No. 63/007,799 entitled "RLF Handling Under Multiple PC5-RRC Connections", filed Apr. 9, 2020, assigned to the assignee hereof and hereby expressly incorporated by reference in its entirety.

CROSS REFERENCE TO RELATED APPLICATIONS

This application is related to the application entitled "PC5 RADIO RESOURCE CONTROL (RRC) SIDELINK (SL) CONNECTION MANAGEMENT", U.S. application Ser. No. 17/913,269, which is a national stage application of PCT/US2021/025321, filed concurrently with this application and incorporated in its entirety herein.

FIELD

This invention generally relates to wireless communications and more particularly to PC5-RRC connection management for sidelink communication with base station notification.

BACKGROUND

Many wireless communication systems that employ several base stations that provide wireless service to user equipment (UE) devices enable sidelink communication between two or more UE devices where the UE devices can communicate directly with other UE devices. Sidelink communication supports vehicle-to-everything (V2X) applications where UE devices in vehicles communicate with other UE devices that may be in vehicles along the roadside, with pedestrians, or any entity that may affect, or may be affected by, the vehicle.

At least some revisions of the 3rd Generation Partnership Project communication specifications specify a PC5 interface for sidelink communication. The PC5 interface makes use of Radio Resource Control (RRC) protocol similar to that used in Uu connection between a UE device and base station. Sidelink communications can use broadcast, groupcast or unicast for transmitting signals. Unicast sidelink communication, however, in some revisions of the 3GPP communication specifications support Radio Link Monitoring (RLM) and Radio Link Failure (RLF) triggering. As a result, UE devices communicating over a unicast PC5 RRC communication link are able to detect failure or degradation of the sidelink radio connection.

SUMMARY

After receiving a PC5 radio resource control (RRC) connection released notification from a source user equipment (UE) device, a base station notifies a peer UE device that connection has been released. Where the base station is the serving base station of the peer UE device, the base station sends a PC5 RRC connection released notification peer message to the peer UE device. Where the base station is not the serving base station of the peer UE device, the base station sends a PC5 RRC connection released notification base station message to the other base station that is serving the peer UE device and the other base station sends a PC5 RRC connection released notification peer message to the peer UE device. In some situations, the base station evaluates data to determine whether notification should be sent to the peer UE device. At least some of the data may be included in the PC5 RRC RLF notification received from the source UE device. After both UE devices have released the original PC5 RRC communication link, a second PC5 RRC communication link may be established to reestablish the original PC5 RRC communication link.

DETAILED DESCRIPTION

Figure 1:
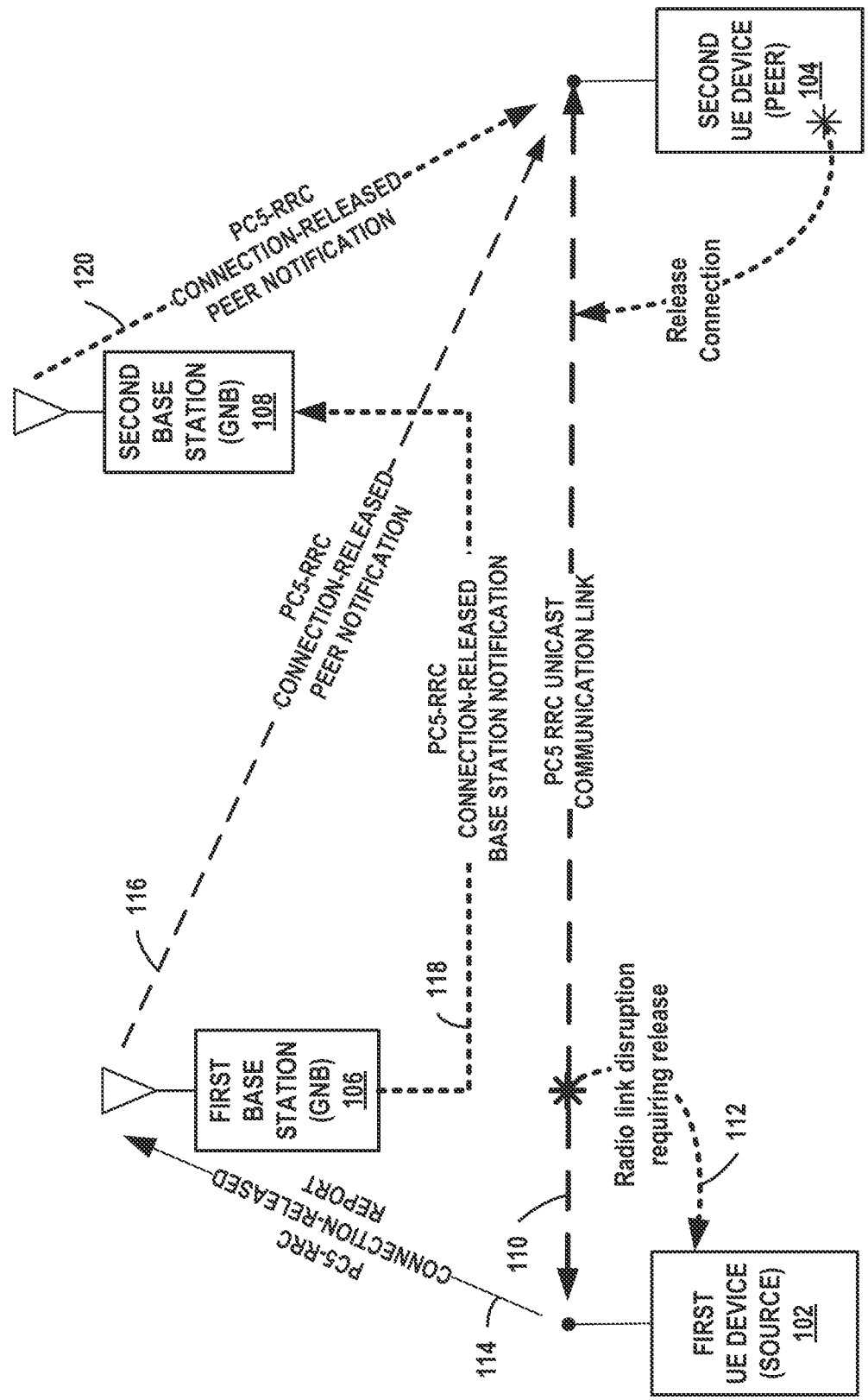
FIG. 1 is a block diagram of an example of a communication system including a first user equipment (UE) device and a second UE device, and two base stations.

As discussed above, in systems operating in accordance with one or more revisions of 3GPP communication specifications, sidelink unicast communications between two or more user equipment (UE) devices are performed over a PC5-RRC link that supports RLF and RLM triggering. Sidelink RLF and RLM differ from the traditional techniques used for Uu RLF and RLM since sidelink communication is half-duplex and prevents the transmission of periodic reference signals. With Uu communication, the UE device can rely on measurement of periodic reference signals sent by the base stations. Half-duplex communication of sidelink prevents the UE device from receiving sidelink while transmitting on sidelink. As a result, a first UE device is not able to receive sidelink transmissions from second UE device at the same time the first UE device is transmitting sidelink reference signals. Nonetheless PC5-RRC link communication supports RLF and RLM allowing for the detection of radio link degradation or failure. In some situations, however, one UE device of a pair may detect a radio link degradation or failure before the other. As a result, PC5 RRC connection management for sidelink communication is needed.

One advantage of detecting the poor or failed communication link and releasing the connection is that it prevents unnecessary interference to other devices in the area. Another advantage is that is allows the two UE devices to establish another link which, in some cases, may be a Uu link through the communication network using one or more base stations. Examples of techniques that allow the UE device to determine that the unicast PC5 RRC link is poor due to a radio or configuration problem and should be disconnected include monitoring the number of RLC retransmissions, the expiration of a timer such as T400, a V2X layer instruction to the AS layer to release the connection, and hybrid automatic repeat request (HARQ)-based SL-RLF. The V2X layer instruction may be based on a keep-alive messaging where messages are periodically, or at least occasionally, sent from the other UE device to indicate that the connection is still active. In accordance with at several revisions of communication specifications, the T400 timer is used to determine whether the sidelink configuration from the source UE device to the peer UE device is or is not successful. The timer is started upon transmission of RRCReconfigurationSidelink by the source UE device. The timer is stopped upon reception of RRCReconfigurationFailureSidelink or RRCReconfigurationCompleteSidelink sent by the peer UE device. When neither of the above two messages is received before the timer expiry, the source UE device will declare SL-RLF and inform the upper layer of the UE device. In RLC-AM (Acknowledged mode), the peer UE device receiving a data transmission is required to send an RLC ACK or NACK (similar to HARQ feedback but at the L2 level rather than physical channel level). If a RLC NACK is received, then the source UE device will retransmit the RLC packet to the peer UE device. This can be repeated up to N times, where N is the configurable max number of RLC retransmissions, before the source UE device declares SL-RLF. These methods for releasing the PC5 RRC links are also associated with mechanisms for link management with different degrees of urgency. The HARQ-based mechanism typically provides the quickest approach to determining when the sidelink fails where the AS layer of the transmitting UE device may inform the upper layer of the link failure. The keep-alive functionality, on the other hand, is generally considered as the mechanism with the least urgency in determining when the unicast link may no longer function properly since the UE device is not expected to request keep-alive message response from its peer UE device more frequently than HARQ feedback messaging. Additionally, even when a particular mechanism is selected, whether it is HARQ-based, keep-alive messaging based, or RLC retransmission based, the effectiveness of the link management can be fine-tuned by configuring the number of consecutive DTX triggering RLF for HARQ-based, the periodicity of keep-alive messaging and the maximum RLC retransmissions. The implemented method and quantity used for link management may be configured or pre-configured by the network which may be dependent on the desired QoS for the intended V2X service(s) for the established PC5-RRC link. For conventional and currently proposed systems, however, there is a need for PC5-RRC connection management for systems with single PC5-RRC connections between two UE devices as well as for systems utilizing multiple PC5-RRC connections between the two UE devices.

In some situations, a single unicast PC5 RRC connection between two UE devices supports multiple V2X layer links between the two UE devices. In these situations, PC5 RRC connection management for sidelink communication is needed since one of the UE devices may detect link disruption before the other because different link management is being used at each UE device or the communication is not symmetrical (e.g., one UE device is transmitting much more frequently than the other). A mechanism is required to determine how and when a connection between the two UE devices is reestablished.

In other situations, each V2X unicast link is implemented on a different PC5 RRC connection. Where multiple PC5 RRC links are used between two UE devices, other scenarios may occur requiring PC5 RRC connection management. More specifically, in systems having multiple PC5 RRC links between two UE devices, link management applied to each of the multiple PC5-RRC connections may be configured independently. Depending on link management configurations for the each of the PC5-RRC connections, the triggering mechanism for declaring sidelink RLF (SL-RLF) and for the corresponding release of PC5-RRC connection may differ. In many cases, when a source UE and a peer UE move out of reach of one another, regardless of which link management mechanism is used for the two connections, SL-RLF will be triggered, although at different times. In some situations, the time difference between the two triggering events may be significant. For example, if the first PC5-RRC connection is configured with a small number of consecutive HARQ DTX, a SL-RLF failure may be quickly triggered if there is a momentary disconnect between the UE devices. If the second PC5-RRC connection uses keep-alive messaging with a long period, a release of the second connection may not occur until much later. Depending on the link management configurations and operation, however, a particular link management technique may not always result in a quicker release than another. If the number of consecutive HARQ DTX are configured with a larger value, for example, the SL-RLF based on HARQ may not be declared before the keep-alive messaging trigger. Therefore, the fact that the first PC5-RRC connection has failed does not necessary imply the peer UE is not reachable by the source UE. This may especially be true for the case when the second PC5-RRC connection does not fail even after a prolonged duration. In typical situations for contemplated systems, a UE device will report a SL-RLF to an upper layer protocol when each of multiple PC5-RRC connections experiences a SL-RLF. Depending on the particular UE device implementation, the upper layer of the source UE device may initiate a new PC5-RRC connection towards the same peer UE device if the second PC5-RRC connection to the peer UE device is still ongoing (SL-RLF did not occur for the second connection).

In some situations where multiple PC5-RRC connections are used between two UE devices, it is possible for the source UE device to retain the associated SL UE context after releasing the connection. When reestablish the released connection, the source UE device may skip sending the UECapabilityEnquirySidelink and initiate the new PC5-RRC with SLRB configuration information within RRCReconfigurationSidelink. When the source UE device decides to initiate a new PC5-RRC connection, the source UE device sends a SLRB configuration to the peer UE, but the peer UE may not have released the previously established PC5-RRC connection for the same V2X service. For example, depending on the configured link management from the gNB of the peer UE device, it may not be possible to adopt a release procedure to inform the peer of its SL-RLF condition. As a result, the peer UE device and its serving gNB are not aware that the new PC5-RRC connection establishment corresponds to SLRB configuration of the existing PC5-RRC connection that has yet to fail. For proposed systems, there is no time alignment between when the source UE device and the peer UE device releases the mutual PC5-RRC connection due to SL-RLF. There are no proposed mechanisms for how the peer UE device would behave when there is a request to establish a PC5-RRC connections for the same V2X service. Therefore, systems where two UE device utilize multiple PC5-RRC unicast connections present additional needs for a PC5-RRC management technique.

FIG. 1 is a block diagram of an example of a communication system 100 including a first user equipment (UE) device 102 and a second UE device 104, and two base stations 106, 108. Although the techniques discussed herein may be applied to various types of systems and communication specifications, the devices of the example operate in accordance with at least one revision of a 3GPP New Radio (NR) V2X or LTE V2X communication specification. The techniques discussed herein, therefore, may be adopted by one or more future revisions of communication specifications although the techniques may be applied to other communication specifications where sidelink or D2D is employed. More specifically the techniques may be applied to current and future releases of 3GPP LTE and NR specifications. For example, the techniques may also be applied to 3GPP NR (Rel-17). For the example, the UE devices 102, 104 may be any type of device that can receive signals from, and transmit signals to, base stations and other UE devices. The UE devices operate in the communication system that includes a plurality of base stations that each provide wireless service within a service area. For the example of FIG. 1, the first UE device 102 is served by a first base station 106 and the second UE device 104 is served by either the first base station 106 or a second base station 108 and may transition between base stations in accordance with known handover techniques. Each of UE devices 102, 104, therefore, may be served by a different base station even though the UE devices 102, 104 are communicating with each other using a unicast sidelink connection.

For the example, the first UE device 102 is a source UE device and the second UE device 104 is a peer UE device where the two UE devices are communicating over a unicast PC5 RRC communication link 110. For the systems discussed herein, unicast connections support Radio Link Monitoring (RLM) and Radio Link Failure (RLF) triggering. RLM and RLF allow a controlling entity, such as a source UE device, to determine whether a connection is still good. If the connection is poor or failed, the controlling entity may take action to quickly disconnect the unicast link. One advantage of detecting the poor or failed communication link and releasing the connection is that it prevents unnecessary interference to other devices in the area. Another advantage is that is allows the two UE devices to establish another link which, in some cases, may be a Uu link through the communication network using one or more base stations. Examples of techniques that allow the UE device to determine that the unicast PC5 RRC link is poor due to a radio or configuration problem and should be disconnected include monitoring the number of RLC retransmissions, the expiration of a timer such as T400, a V2X layer instruction to the AS layer to release the connection, and HARQ-based SL-RLF. The V2X layer instruction may be based on a keep-alive messaging where messages are periodically, or at least occasionally, sent from the other UE device to indicate that the connection is still active. These methods for releasing the PC5 RRC links are also associated with mechanisms for link management with different degrees of urgency. The HARQ-based mechanism typically provides the quickest approach to determining when the sidelink fails where the AS layer of the transmitting UE device may inform the upper layer of the link failure. The keep-alive functionality, on the other hand, is generally considered as the mechanism with the least urgency in determining when the unicast link may no longer function properly since the UE device is not expected to request keep-alive message response from its peer UE device more frequently than HARQ feedback messaging. Additionally, even when a particular mechanism is selected, whether it is HARQ-based, keep-alive messaging based, or RLC retransmission based, the effectiveness of the link management can be fine-tuned by configuring the number of consecutive DTX triggering RLF for HARQ-based, the periodicity of keep-alive messaging and the maximum RLC retransmissions. The implemented method and quantity used for link management may be configured or pre-configured by the network which may be dependent on the desired QoS for the intended V2X service(s) for the established PC5-RRC link.

During the unicast sidelink communication of the example of FIG. 1, the source UE device 102 detects, or otherwise is made aware of, a radio link disruption 112 that requires the source UE device to release the PC5 RRC unicast connection. The detection of the radio link disruption or determination to release the PC5 RRC unicast connection may be based on any of the examples discussed above as well as combination and other techniques. Therefore, the detection of a radio link disruption is any determination of a poor or failed link where typical examples include RLF indicators or RLM indicators indicating a poor link.

After releasing the connection 110, the source UE device 102 send a PC5 RRC Connection-Released report 114 to its serving base station (first base station) 106 where the PC5 RRC Connection-Released report 114 at least indicates that the source UE device 102 has released the PC5 RRC communication link 110 with the second UE device 104. As discussed below in further detail, the PC5 RRC Connection-Released report 114 may be a message currently defined by one or more revisions of a communication specification, a modified version of a message currently defined by a revision of a communication specification, or another type of transmission. For example, the PC5 RRC Connection-Released report 114 may be an RRC message such as a SidelinkUEInformation Message or a SidelinkUEInformation Message that includes additional information elements to those currently defined. In some situations, the PC5 RRC Connection-Released report 114 may be a transmission other than an RRC message. For the example of FIG. 1A, the source UE device 102 transmits the RRC message using previously dedicated Uu resources allocated to the source UE device for uplink transmission. In some cases, the Uu resources may have been allocated for other purposes. In some situations, the source UE device 102 may need to send a Scheduling Request (SR) to request communication resources from the base station (gNB) 106 for transmitting the RRC message.

The first base station (gNB) 106 receives the PC5 RRC Connection-Released report 114 and determines whether the peer UE device 104 should be notified that the source UE device 102 has released the PC5 RRC communication link 110. Where the base station 106 determines that the peer UE device 104 should be notified, the base station 106 sends a PC5 RRC Connection-Released peer notification 116 directly to the peer UE device 104 if the base station 102 is the serving base station or sends a PC5 RRC Connection- Released base station notification 118 to the serving base station of the peer UE device 104, otherwise. For the example of FIG. 1A, the serving base station of the peer UE device 104 is either the first base station 106 or the second base station 108. Therefore, first base station 106 sends the PC5 RRC Connection-Released base station notification 118 to second base station 108 when the second base station 108 is the serving base station of the peer UE device 104. Although other techniques may be used, the PC5 RRC Connection-Released base station notification 118 is sent over an Xn link. After receiving the PC5 RRC Connection-Released base station notification 118, the second base station 108 sends a PC5 RRC Connection-Released peer notification 120 to notify the peer UE device 120 that the link 110 has been released. In some situations, the second base station 108 may evaluate other factors before sending the peer notification 120 and may refrain from sending the peer notification 120. For example, the second base station 108 may determine whether a report, such as a SidelinkUE-Information Message, has been received from the peer UE device 104 that indicates the peer UE device 104 has released the PC5 RRC communication link 110. When the peer UE device 104 is to be notified of the released link, therefore, either the peer notification 116 is transmitted or the base station notification 118 and peer notification 120 are transmitted.

Figure 2:
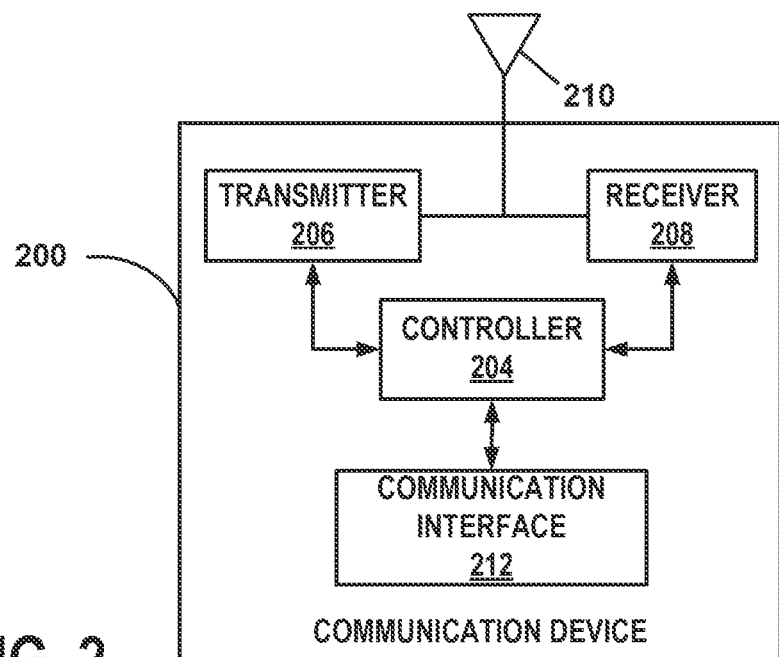
FIG. 2 is a block diagram of an example of a base station suitable for use as each of the base stations.

FIG. 2 is a block diagram of an example of a base station 200 suitable for use as each of the base stations 106, 108. The base station 200 includes a controller 204, transmitter 206, and receiver 208, as well as other electronics, hardware, and code. The base station 200 is any fixed, mobile, or portable equipment that performs the functions described herein. The various functions and operations of the blocks described with reference to the base stations 102, 104 may be implemented in any number of devices, circuits, or elements. Two or more of the functional blocks may be integrated in a single device, and the functions described as performed in any single device may be implemented over several devices. The base station 200 may be a fixed device or apparatus that is installed at a particular location at the time of system deployment. Examples of such equipment include fixed base stations or fixed transceiver stations. Although the base station may be referred to by different terms, the base station is typically referred to as a gNodeB or gNB when operating in accordance with one or more communication specifications of the 3GPP V2X operation. In some situations, the base station 200 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 200 may be a portable device that is not fixed to any particular location.

The controller 204 includes any combination of hardware, software, and/or firmware for executing the functions described herein as well as facilitating the overall functionality of the base station 200. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2 perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals and can apply any one of a plurality of modulation orders. The demodulator demodulates any uplink signals received at the base station 200 in accordance with one of a plurality of modulation orders.

The base station 200 includes a communication interface 212 for transmitting and receiving messages with other base stations. The communication interface 212 may be connected to a backhaul or network enabling communication with other base stations. In some situations, the link between base stations may include at least some wireless portions. The communication interface 212, therefore, may include wireless communication functionality and may utilize some of the components of the transmitter 206 and/or receiver 208.

Figure 3:
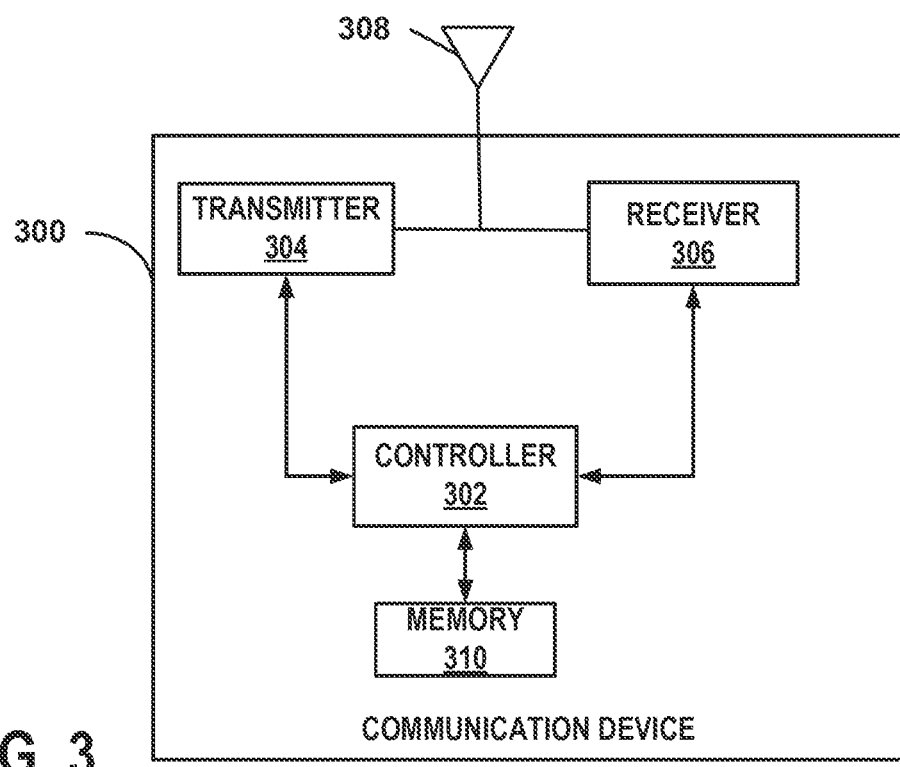
FIG. 3 is a block diagram of an example of a UE device suitable for use as each of the UE devices.

FIG. 3 is a block diagram of an example of a UE device 300 suitable for use as each of the UE devices 102, 104. In some examples, the UE device 300 is any wireless communication device such as a mobile phone, a transceiver modem, a personal digital assistant (PDA), a tablet, or a smartphone. In other examples, the UE device 300 is a machine type communication (MTC) communication device or Internet-of-Things (IOT) device. The UE device 300, therefore is any fixed, mobile, or portable equipment that performs the functions described herein. The various functions and operations of the blocks described with reference to UE device 300 may be implemented in any number of devices, circuits, or elements. Two or more of the functional blocks may be integrated in a single device, and the functions described as performed in any single device may be implemented over several devices.

The UE device 300 includes at least a controller 302, a transmitter 304 and a receiver 306. The controller 302 includes any combination of hardware, software, and/or firmware for executing the functions described herein as well as facilitating the overall functionality of a communication device. An example of a suitable controller 302 includes code running on a microprocessor or processor arrangement connected to memory. The transmitter 304 includes electronics configured to transmit wireless signals. In some situations, the transmitter 304 may include multiple transmitters. The receiver 306 includes electronics configured to receive wireless signals. In some situations, the receiver 306 may include multiple receivers. The receiver 304 and transmitter 306 receive and transmit signals, respectively, through antenna 308. The antenna 308 may include separate transmit and receive antennas. In some circumstances, the antenna 308 may include multiple transmit and receive antennas.

The transmitter 304 and receiver 306 in the example of FIG. 3 perform radio frequency (RF) processing including modulation and demodulation. The receiver 304, therefore, may include components such as low noise amplifiers (LNAs) and filters. The transmitter 306 may include filters and amplifiers. Other components may include isolators, matching circuits, and other RF components. These components in combination or cooperation with other components perform the communication device functions. The required components may depend on the particular functionality required by the communication device.

The transmitter 306 includes a modulator (not shown), and the receiver 304 includes a demodulator (not shown). The modulator can apply any one of a plurality of modulation orders to modulate the signals to be transmitted as part of the uplink signals. The demodulator demodulates the downlink signals in accordance with one of a plurality of modulation orders.

Figure 4:
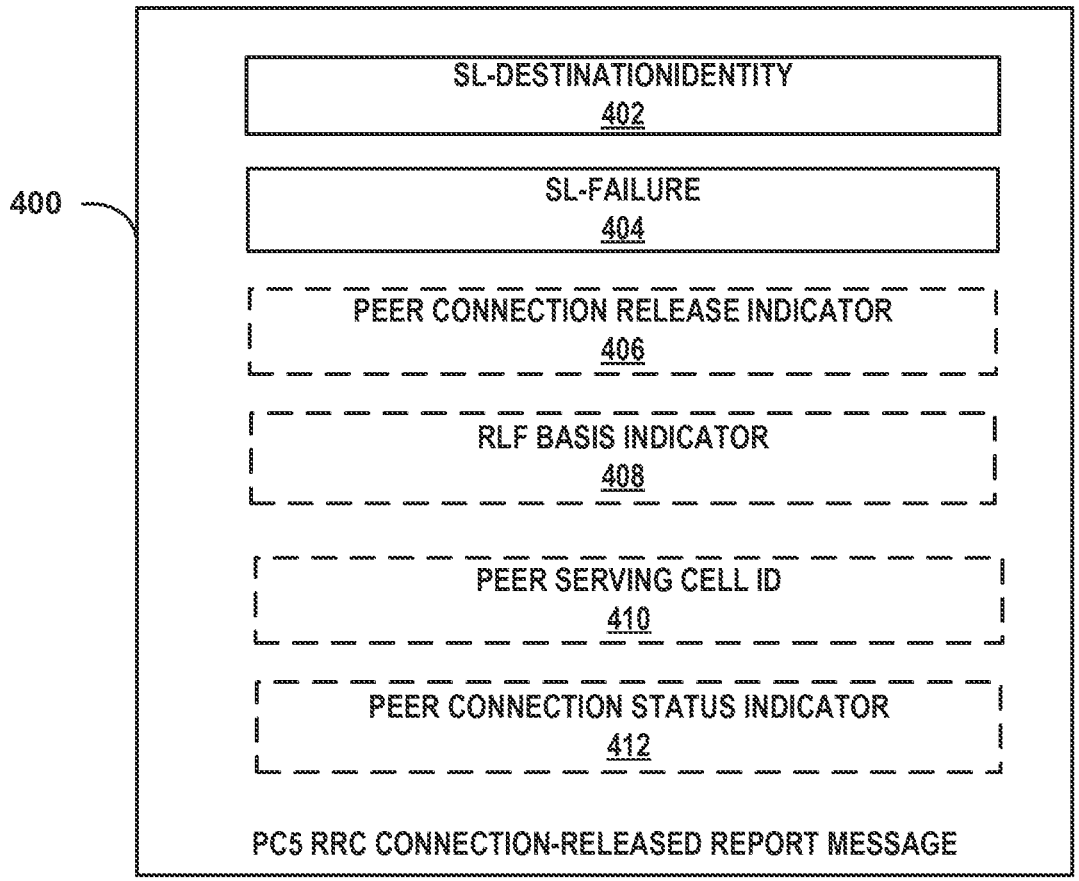
FIG. 4 is a block diagram of an example of a PC5 RRC connection-released report message suitable for use as the PC5 RRC connection-released report.

FIG. 4 is a block diagram of an example of a PC5 RRC connection-released report message 400 suitable for use as the PC5 RRC connection-released report 114. For the example, the PC5 RRC connection-released report message 400 is an RRC message formatted and transmitted in accordance with the SidelinkUEInformation Message defined in by one or more revisions of 3GPP LTE and NR communication specifications. Therefore, the report message 400 includes at least an SL-Destinationidentity information element 402 and an SL-Failure information element 404. As is known, the SL-Destinationidentity information element 402 indicates the destination for which the SL failure is reporting for unicast and the SL-Failure information element 404 indicates the sidelink failure cause for the sidelink RLF (value rlf) and sidelink AS configuration failure (value configFailure) for the associated destination for unicast.

In some situations, additional information may be provided in the report message 400 or in associated messages. For example, information regarding whether the source UE device has observed that the peer UE device has declared RLF for the particular link can be included. Accordingly, a peer connection release indicator IE 406 may be included in the report message 400 in some situations. The peer connection release indicator IE 406 may be a flag that indicates that the source UE device has declared SL-RLF with no indication that the peer UE device has declared SL-RLF. For example, presence of the flag may indicate that no new sidelink connection request has been received from the peer UE device and absence of the flag may indicate that source UE device is aware that the peer UE device has already declared SL-RLF. In typical situations, a UE device is required to inform its serving gNB when SL-RLF is declared if the UE device is in the connected (CONN) state. The source UE device 102 may determine that the peer UE device has declared SL-RLF based on information received form the peer UE device 104. In some situations, the source UE device 102 determines that the peer UE device 104 has declared SL-RLF because the source UE device 102 has received a connection request from the peer UE device 104 where the connection request has the same SLRB as the PC5 RRC communication link 110. The base station determines that the new connection request is an attempt by the peer UE device 104 to re-establish the link and that it has declared SL-RLF. As discussed below, the peer connection release indicator IE 406 may assist the base station 106 in the determination on whether the peer UE device 104 needs to be notified of the RLF.

Other additional information that may be included in the report message 400 includes information related to how the source UE device has detected the SL-RLF. For example, the report message 400 may include a RLF basis indicator IE 408 that identifies the method or methods used to detect the SL-RLF and may indicate that the detection was a result of keep-alive messaging, HARQ messaging, T400 expiration or some other mechanism. Such information could be used by the base station 106 in determining whether the peer UE device 104 needs to be notified of the RLF since the basis of the source UE device declaration of RLF may provide information regarding the likelihood that the peer UE device is aware of the RLF.

Examples of other additional information that may be included in the message 400 includes a peer serving cell ID 410 indicating the cell ID of the serving cell of the peer UE device 104 and a peer connection status indicator 412 indicating the connection status of the peer UE device 104. In some situations, information regarding connection between the peer UE device 104 and its serving base station can be exchanged between the two UE devices prior to the RLF detection. The information, therefore, may include the connected (CONN) status of the second UE device 104 and the cell ID of the peer UE device serving cell. The inclusion of additional information such as the peer connection release indicator IE 406, the RLF basis indicator IE 408, peer serving cell ID 410 and the peer connection status indicator 412 may provide additional advantages when the two EU device are served by different base station since inter-node signalling may be avoided where the base station determines that the peer UE device would most likely have already declared SL-RLF or is not in the connected (CONN) state with the ability to receive any notifications from its serving cell.

The blocks representing the peer connection release indicator IE 406, the RLF basis indicator IE 408, the peer serving cell ID 410 and the peer connection status indicator 412 are shown with dashed lines to indicate that the information elements are optional and, even if included in the report message 400, may not include information for a particular report message 400 transmission. In some situations, for example, where the UE devices exchange their serving cell IDs with each other over the sidelink, the peer connection release indicator IE 406, the RLF basis indicator IE 408, the peer serving cell ID 410, and the peer connection status indicator 412 may be omitted where the source UE device 102 reporting the failure determines that the peer UE device 104 is served by the same base station 106.

In some situations, the UE devices 102, 104 may exchange information relating to the current mode of operation. For example, each UE device 102, 104 may inform the other whether it is in the connected (CONN) mode. Such information can be forwarded to the base station 106 in the report message 400 and may be useful where the peer UE device is served by different base station. The base station may avoid inter-node signaling with the serving base station 108 of the peer UE device where the peer UE device is not in the connected (CONN) mode.

For the example, the PC5 RRC connection-released report message 400 is an RRC message transmitted over previously dedicated Uu resources allocated to the source UE device for uplink transmission. In some cases, the Uu resources may have been allocated for other purposes. Also, the source UE device 102 may need to send a Scheduling Request (SR) to request communication resources from the base station (gNB) 106 for transmitting the RRC message.

Figure 5:
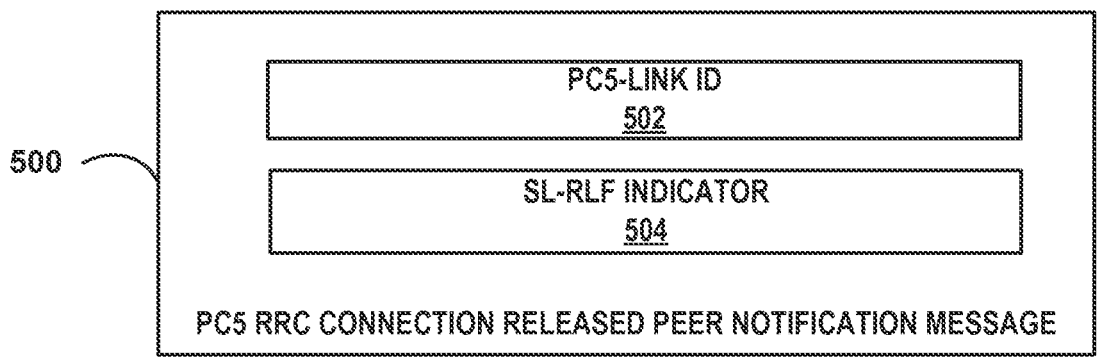
FIG. 5 is a block diagram of an example of a PC5 RRC connection-released peer notification message suitable for use as the PC5 RRC connection-released PC5 RRC connection-released peer notification and the PC5 RRC connection-released PC5 RRC connection-released peer notification.

FIG. 5 is a block diagram of an example of a PC5 RRC connection-released peer notification message 500 suitable for use as the PC5 RRC connection-released PC5 RRC connection-released peer notification 116 and the PC5 RRC connection-released PC5 RRC connection-released peer notification 120. For the example, the PC5 RRC connection-released peer notification message 500 is an RRC message formatted and transmitted in accordance with an RRC message defined by one or more revisions of 3GPP LTE and NR communication specifications. Although the peer notification message 500 may be a new message, the peer notification message 500 may be included as part of an RRC Reconfiguration message. For the examples herein, the notification message 500 includes a PC5 link ID 502 that uniquely identifies the PC5 RRC communication link 110 and a SL-RLF indicator 504 indicating that PC5 RRC communication link 110 has been released. In some situations where only one PC5 RRC link is supported between two UE devices, the PC5 link ID 502 may be replaced with the UE ID of the source UE device 102 (the peer UE device of the UE device 104).

Figure 6:
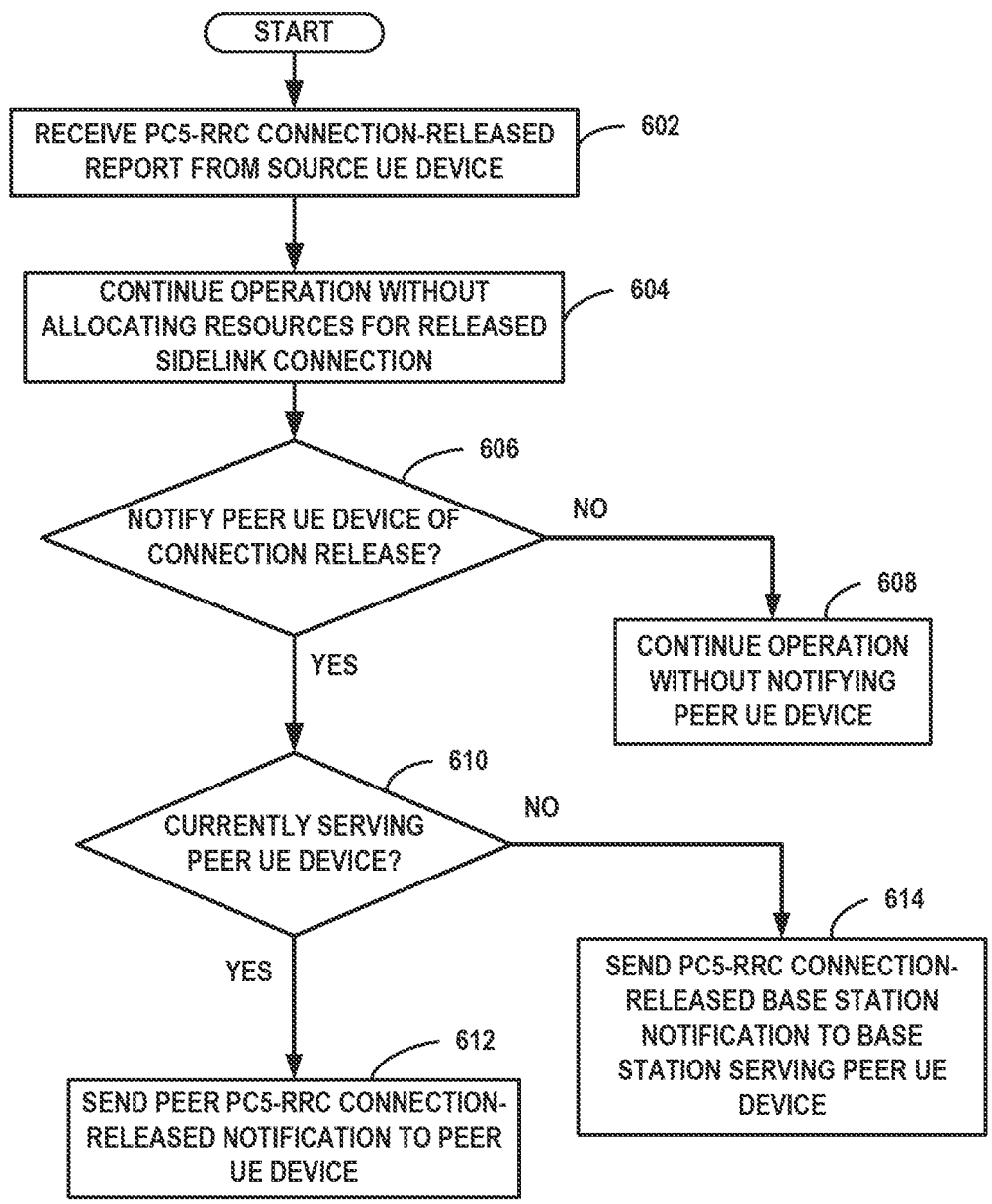
FIG. 6 is a flow chart of an example of a method of managing PC5 RRC connections by a base station (gNB) serving a source UE device that has detected a radio link disruption.

FIG. 6 is a flow chart of an example of a method 600 of managing PC5 RRC connections by a base station (gNB) serving a source UE device that has detected a radio link disruption. For the example, the method 600 is performed by gNB operating in a NR V2X or LTE C-V2X system such as the system 100 described above. Accordingly, the method may be performed by the first base station 106. Other steps may be performed as part of the method and some steps may be omitted.

At step 602, a PC5 RRC connection-released report 114 is received. For the example, a PC5 RRC connection-released report message 400 is received from the source UE device 102 as an RRC message.

At step 604, operation is continued without allocating communication resources for the released sidelink connection identified in the message 400.

At step 606 it is determined whether the peer UE device should be notified of the release of the PC5 RRC communication link. The base station 102 may evaluate any number of factors in determining whether the peer UE device should be notified. Some examples of information that may be evaluated include whether the peer UE device has already declared SL-RLF, whether it is likely the peer UE device has already released the PC5 RRC communication link based the basis for the RLF detection of the source UE device, whether the peer UE device is in the connected state, and whether the peer UE device is served by another base station. An example of a method of determining whether the peer UE device should be notified is discussed with reference to FIG. 7. If the base station determines that the peer UE device should not be notified, the base station continues operation at step 608 without notifying the peer UE device 104. Otherwise, the method continues at step 610.

At step 610, it is determined whether the base station is the serving base station of the peer UE device 104. If the base station 102 is the serving bases station of the peer UE device 104, the method continues at step 612. Otherwise, the method continues at step 614.

At step 612, the base station 102 sends a PC5 RRC connection-released peer notification 116 to the peer UE device 104. As discussed above, an RRC message such as an RRC reconfiguration message is sent to the peer UE device 104.

At step 614, the base station sends a PC5 RRC connection-released base station notification 118 to the base station that is serving the peer UE device. For the example, the base station 106 sends inter-node signaling over an Xn connection notifying the serving base station 108 of the SL-RLF detection by the source UE device. For the examples, the PC5 RRC connection-released base station notification 118 identifies the source UE device, the peer UE device, and the PC5 RRC communication link 110. Accordingly, the message sent over the Xn interface includes the UE IDs of the two UE devices 102, 104 and a PC5 link ID.

Figure 7:
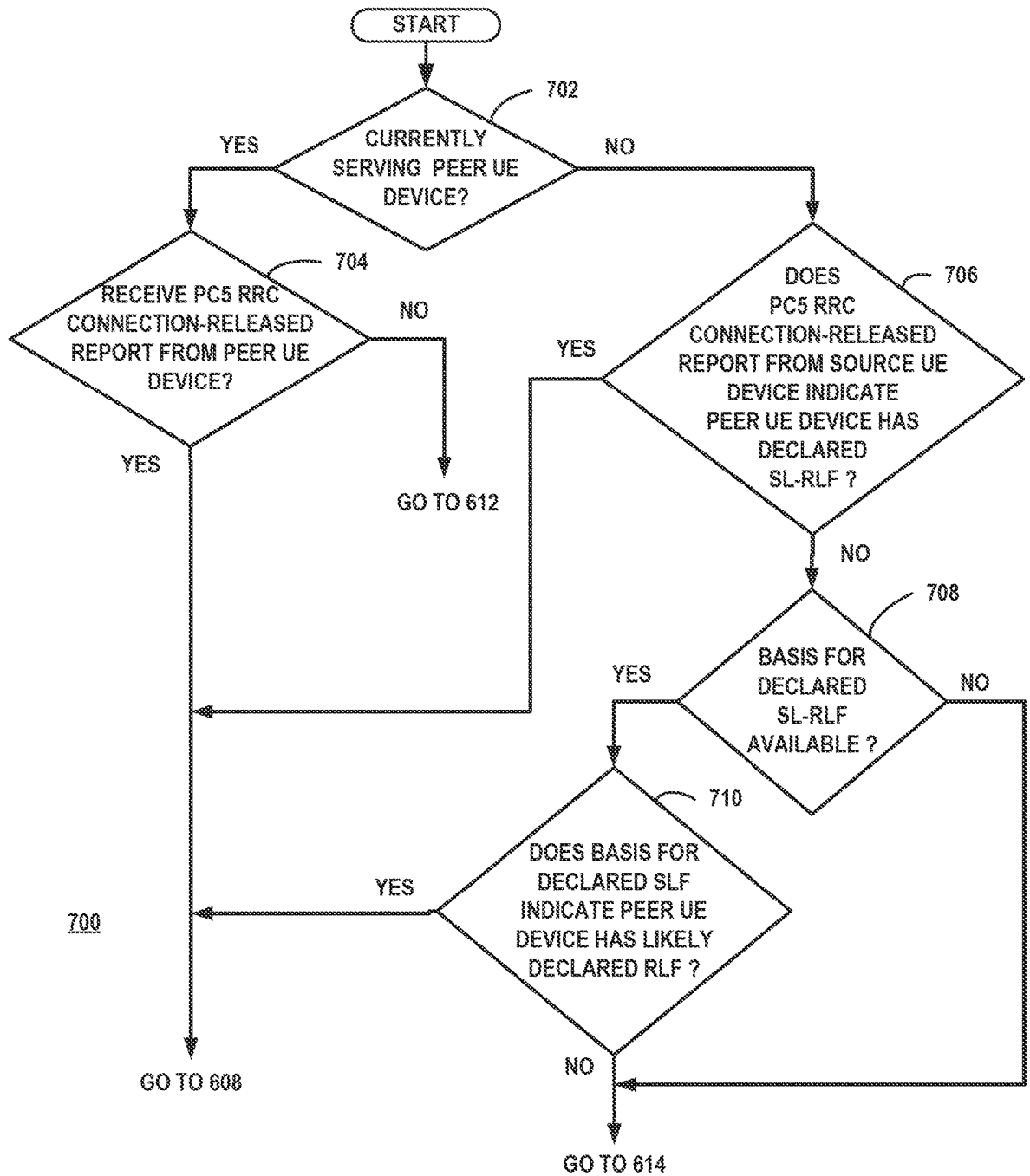
FIG. 7 is a flow chart of an example of a method of determining whether the peer UE device should be notified of the SL-RLF detected by the source UE device.

FIG. 7 is a flow chart of an example of a method 700 of determining whether the peer UE device 104 should be notified of the SL-RLF detected by the source UE device 102. Accordingly, the method discussed with reference to FIG. 7 is an example of performing step 606 and step 610 of FIG. 6.

At step 702, it is determined whether the base station is currently the serving base station of the peer UE device 104. If it is the serving base station of the peer UE device 104, the method continues at step 704. Otherwise, the method proceeds to step 706.

At step 704, it is determined whether a PC5 RRC connection-released report has been received from the peer UE device 104. If no report has been received, the method continues at step 612 of FIG. 6 where the PC5 RCC connection-released peer notification 116 is sent to the peer UE device. If, however, the peer UE device 104 had notified the base station that it has detected SL-RLF for the communication link 110, there is no need for the base station 106 to send a notification to the peer UE device 104 and the method continues at step 608 where operation continues without sending a notification 116.

At step 706, it is determined whether the PC5 RRC connection-released report received from the source UE device indicates that the peer UE device 104 has declared SL-RLF. For the example, the base station determines whether the peer connection release indicator 406 of the PC5 RRC connection-released report message 400 includes a flag indicating that peer UE device has declared SL-RLF. If report indicates that peer UE device has declared SL-RLF, the method continues at step 608 where operation continues without sending a notification 116. Otherwise, the method proceeds to step 708.

At step 708, it is determined whether the basis for the source UE device 102 declaring SL-RLF is known. For the example, the base station 102 evaluates the RLF basis indicator IE 108 in the PC5 RRC connection-released report message 400 to determine if data has been provided by the source UE device regarding the mechanism used for declaring SL-RLF. The basis for RLF may be determined in other ways in some situations. if the basis is not known, the method proceeds to step 614 where the base station 106 sends a PC5 RRC connection-released base station notification 118 to the base station (108) that is serving the peer UE device 104.

At step 708, it is determined whether the basis for the source UE device 102 declaring SL-RLF indicates it is likely that the peer UE device 104 has declared SL-RLF. For the example, the base station 102 evaluates the RLF basis indicator IE 108 in the PC5 RRC connection-released report message 400 to identify the mechanism used to determine RLF at the source base station 102. The base station then determines whether the mechanism indicates that the peer UE device 104 has likely already declared, or will likely declare in a short time, SL-RLF. Where the basis is a keep-alive messaging detection, for example, the base station determines it is likely that the peer UE device has, or will quickly, declare SL-RLF and the method continues at step 608 where no peer notification is sent and the serving base station is not notified. Where the basis is HARQ DTX feedback, however, the base station determines it is unlikely that the peer UE device has, or will quickly, declare SL-RLF and the method continues at step 614 where a PC5 RRC connection-release base station notification 118 is sent to the serving base station.

Figure 8:
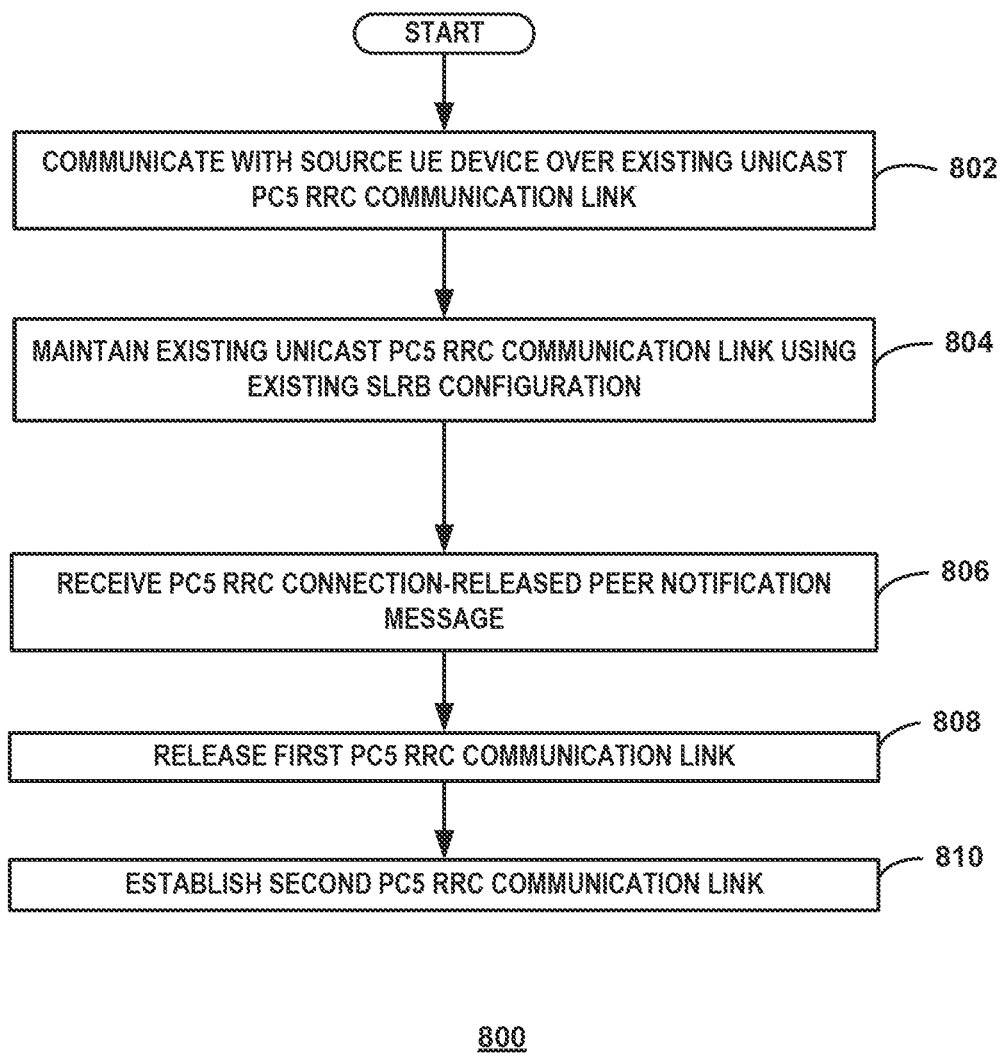
FIG. 8 is a flow chart of an example of a method of managing PC5 RRC connections by a UE device that has not yet detected a radio link disruption.

FIG. 8 is a flow chart of an example of a method 800 of managing PC5 RRC connections by a UE device that has not yet detected a radio link disruption. For the example, the method is performed by a UE device operating in a NR V2X or LTE C-V2X system such as the system 100 described above. Accordingly, the method may be performed by the second UE device 104.

At step 802, the UE device communicates with another UE device 102 over an existing unicast PC5 RRC communication link 110 using an existing SLRB configuration.

At step 804, the existing unicast PC5 RRC communication link 110 using the existing SLRB configuration is maintained. Although the link 110 may have failed or has degraded to a point that it is not sufficient for the application communication, the second UE device 104 may not be aware of the change in status. In some situations, the second UE device may not have received any HARQ feedback messaging but is not expecting to receive any HARQ messages because messages sent to the first UE device did not require HARQ feedback. In some situations, keep-alive messaging may not be available from the first UE device 102 or the period between keep alive messages may be long. In other words, the second UE device may be sending keep-alive messages more frequently than the first UE device 102 or the first UE device 102 may not be sending any keep alive messages. As a result, the first UE device may detect the radio link degradation or failure before the second UE device. The second UE device 104, therefore, maintains the unicast PC5 RRC communication link 110 and maintains the existing SLRB configuration that supports the unicast PC5 RRC communication link 110.

At step 806, a PC5 RRC connection-released peer notification that identifies the PC5 RRC communication link 110 and indicates that the link 110 has been released. For the example, the second UE device 104 receives a PC5 RRC connection-released peer notification message 500. The message is received from the second UE device 104 from its serving base station which may be the first base station 106 or the second base station 108.

At step 808, the PC5 RRC communication link 110 is released. In accordance with known techniques, the second UE device 104 releases the PC5 RRC communication link 110 and informs the upper layer of the release. When in coverage of a gNB and in the connected mode, the UE device may inform its serving gNB. In some implementations, the system 100 may support multiple PC5 RRC communication links between two UE devices. In such situations, the UE device 104 releases the PC5 RRC communication link that is identified in the message 500.

At step 810, the second unicast PC5 RRC communication link is established to replace the recently released link 110. In accordance with known techniques, the second UE device 104 communicates with the first UE device 102 and the serving gNB (base station) to establish the second link and, thereby, reestablish the previous first link 110. In some situation, step 810 is omitted and a Uu communication link is established through one or more base stations.

Figure 9:
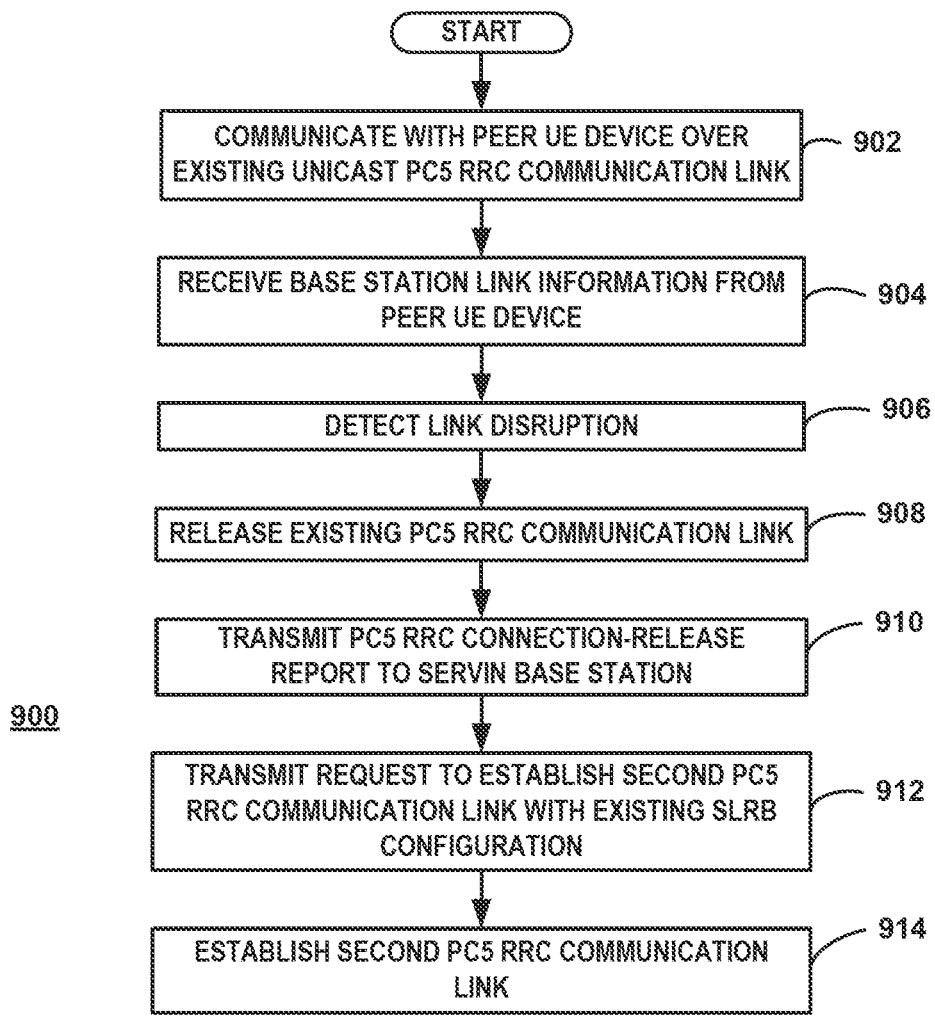
FIG. 9 is a flow chart of an example of a method of managing PC5 RRC connections by a UE device detecting a radio link disruption.

FIG. 9 is a flow chart of an example of a method 900 of managing PC5 RRC connections by a UE device detecting a radio link disruption. For the example, the method is performed by a UE device operating in a NR V2X or LTE C-V2X system such as the system 100 described above. Accordingly, the method may be performed by the first UE device 102. Other steps may be performed as part of the method and some steps may be omitted. For example, step 914 is omitted and a Uu communication link is established with the second UE device 104 in some circumstances. In another example, step 904 can be omitted.

At step 902, the UE device communicates with a second UE device 104 over an existing unicast PC5 RRC communication link 110 using an existing SLRB configuration.

At step 904, information regarding connection between the peer UE device and its serving base station in received from the second UE device (peer UE device) 104. Examples of information includes the connected (CONN) status of the second UE device 104 and the cell ID of its serving cell. In the example, each device exchanges its connection information with its peer. As a result, the first UE device may send its cell ID and connection status to the second UE device as part of step 904.

At step 906, a link disruption of the existing unicast PC5 RRC communication link 110 is detected. As discussed above, the link disruption may be detected based on RLF, RLM, keep-alive messaging, a T400 timer, or combinations of indicators. In addition, the link disruption may be detected based on receipt of a connection request from the second UE device where the connection request has the same SLRB as the communication link 110.

At step 908, the existing unicast PC5 RRC communication link 110 is released.

At step 910, a PC5 RRC connection-released report 114 is sent to the serving base station. As discussed above, an example of suitable report includes transmission of a PC5 RRC connection-released report message 400 formatted and transmitted in accordance with the SidelinkUEInformation Message defined in by one or more revisions of 3GPP LTE and NR communication specifications. The PC5 RRC connection-released report message 400 includes at least an SL-Destinationidentity information element 402 and an SL-Failure information element 404. For the example, the message 400 also includes a peer connection release indicator IE 406 and a RLF bases indicator IE 408. The peer connection release indicator IE 406 includes an indication on whether the second UE device has reported a RLF and can be based on whether a connection request having the same SLRB as the communication link 110 has been received from the second UE device 104.

At step 912, a request to establish a second unicast PC5 RRC communication link is transmitted to second UE device 104 where the second unicast PC5 RRC communication link has the existing SLRB configuration. The first UE device 102, therefore, attempts to reestablish the original PC5 link 110 by requesting a second PC5 link having the same SLRB configuration. For the examples herein, the request is a Direct Communication Request message.

At step 912, the second unicast PC5 RRC communication link is established to reestablish the original PC5 RRC link 110. The first UE device exchanges messages with the second UE device 104 and a gNB, if needed, to establish the second unicast PC5 RRC connection in accordance with known techniques.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method performed at a base station, the method comprising:
   receiving a PC5 Radio Resource Control (RRC) communication-released report from a source user equipment (UE) device, PC5 RRC communication-released report indicating that a PC5 RRC communication link with a peer UE device has been released;
   determining whether a PC5 RRC communication-released peer notification should be sent to the peer UE device, the PC5 RRC communication-released peer notification indicating to the peer UE device that the PC5 RRC communication link has been released by the source UE device;
   initiating transmission of the PC5 RRC communication-released notification to the peer UE device in response to determining that PC5 RRC communication-released notification should be sent.

2. The method of claim 1, wherein initiating transmission of the PC5 RRC communication-released peer notification comprises transmitting a PC5 RRC communication-released peer notification message to the peer UE device.

3. The method of claim 2, wherein the PC5 RRC communication-released peer notification message is a radio resource control (RRC) message.

4. The method of claim 3, wherein the PC5 RRC communication-released report message is a SidelinkUEInformation Message formatted and transmitted in accordance with at least one revision of 3rd Generation Partnership Project (3GPP) communication specifications.

5. The method of claim 3, wherein initiating transmission of the PC5 RRC communication-released peer notification comprises transmitting a PC5 RRC communication-released base station notification message to a serving base station of the peer UE device to invoke transmission of a PC5 RRC communication-released peer notification message from the serving base station to the peer UE device.

6. The method of claim 5, wherein the PC5 RRC communication-released report message comprises a peer connection release indicator indicating whether the source UE device has determined that the peer UE device has released the PC5 RRC communication link.

7. The method of claim 5, wherein the PC5 RRC communication-released report message comprises a radio link failure (RLF) basis indicator indicating a mechanism used by the source UE device to detect a sidelink RLF (SL-RLF) resulting in the release of the PC5 RRC communication link.

8. The method of claim 7, wherein the RLF basis indicator indicates at least one of expiration of T400, hybrid automatic repeat request (HARQ)-based SL-RLF, keep-alive messaging, and Radio Link Control (RLC) retransmission.

9. The method of claim 5, wherein the PC5 RRC communication-released report message comprises a peer serving cell identification (ID) indicating the cell ID of a serving cell of the peer UE device.

10. The method of claim 5, wherein the PC5 RRC communication-released report message comprises a peer connection status indicator indicating at least whether the peer UE device is in the connected (CONN) state.

11. The method of claim 1, wherein the determining whether the PC5 RRC communication-released peer notification should be sent to the peer UE device comprises determining at least one of:
   whether the peer UE device has declared sidelink radio link failure (SL-RLF); and
   whether the peer UE device is likely to declare SL-RLF based on a RLF detection basis used by the source UE device to detect RLF resulting in the release of the PC5 RRC communication link.

12. A base station comprising:
   a memory;
   a receiver configured to receive a PC5 Radio Resource Control (RRC) communication-released report from a source user equipment (UE) device, the PC5 RRC communication-released report indicating that a PC5 RRC communication link with a peer UE device has been released;
   and a controller configured to: determine whether a PC5 RRC communication-released peer notification should be sent to the peer UE device, the PC5 RRC communication-released peer notification indicating to the peer UE device that the PC5 RRC communication link has been released by the source UE device, and initiate transmission of the PC5 RRC communication-released notification to the peer UE device in response to determining that PC5 RRC communication-released notification should be sent.

13. The base station of claim 12, further comprising a transmitter configured to transmit a PC5 RRC communication-released peer notification message to the peer UE device.

14. The base station of claim 13, wherein the PC5 RRC communication-released peer notification message is a radio resource control (RRC) message.

15. The base station of claim 14, wherein the PC5 RRC communication-released report message is a SidelinkUEInformation Message formatted and transmitted in accordance with at least one revision of 3rd Generation Partnership Project (3GPP) communication specifications.

16. The base station of claim 12, further comprising a communication interface configured to transmit a PC5 RRC communication-released base station notification message to a serving base station of the peer UE device to invoke transmission of a PC5 RRC communication-released peer notification message from the serving base station to the peer UE device.

17. The base station of claim 16, wherein the PC5 RRC communication-released report message comprises a peer connection release indicator indicating whether the source UE device has determined that the peer UE device has released the PC5 RRC communication link.

18. The base station of claim 16, wherein the PC5 RRC communication-released report message comprises a radio link failure (RLF) basis indicator indicating a mechanism used by the source UE device to detect a sidelink RLF (SL-RLF) resulting in the release of the PC5 RRC communication link.

19. The base station of claim 16, wherein the RLF basis indicator indicates at least one of expiration of T400, hybrid automatic repeat request (HARQ)-based SL-RLF, keep-alive messaging, and Radio Link Control (RLC) retransmission.

20. The base station of claim 16, wherein the PC5 RRC communication-released report message comprises a peer serving cell identification (ID) indicating the cell ID of a serving cell of the peer UE device.

21. The base station of claim 16, wherein the PC5 RRC communication-released report message comprises a peer connection status indicator indicating at least whether the peer UE device is in the connected (CONN) state.

22. The base station of claim 12, wherein controller is configured to determine whether the PC5 RRC communication-released peer notification should be sent to the peer UE device by determining at least one of:
  whether the peer UE device has declared sidelink radio link failure (SL-RLF); and
  whether the peer UE device is likely to declare SL-RLF based on a RLF detection basis used by the source UE device to detect RLF resulting in the release of the PC5 RRC communication link.

23. A peer user equipment (UE) device comprising:
  a memory;
  a transceiver configured to maintain a PC5 Radio Resource Control (RRC) communication link with a source UE device;
  a receiver configured to receive, from a base station, a PC5 RRC communication-released peer notification indicating a source UE device has released the PC5 RRC communication link;
  and a controller configured to release the PC5 RRC communication link in response to the PC5 RRC communication-released peer notification.

24. The peer UE device of claim 23, wherein the PC5 RRC communication-released peer notification is a PC5 RRC communication-released peer notification message transmitted as an RRC message in accordance with at least one revision of 3rd Generation Partnership Project (3GPP) communication specifications.

25. The peer UE device of claim 24, wherein the PC5 RRC communication-released peer notification is transmitted by the base station in response to the base station receiving a PC5 RRC communication-released report from the source UE device, the PC5 RRC communication-released report indicating that the PC5 RRC communication link has been released by the source UE device.

* * * * *